United States Patent
Yang et al.

(10) Patent No.: US 11,198,828 B2
(45) Date of Patent: Dec. 14, 2021

(54) PROCESS FOR HYDROGEN SULFIDE SCRUBBING AND METHOD FOR FERRIC ION REGENERATION

(71) Applicants: BIONOMIC INDUSTRIES INC., Mahwah, NJ (US); UNIVERSITY OF MASSACHUSETTS, A PUBLIC INSTITUTION OF HIGHER EDUCATION OF THE COMMONWEALTH OF MASSACHUSETTS, Boston, MA (US)

(72) Inventors: Chen-Lu Yang, Westport, MA (US); Kumari I. Kaushik, Abilene, TX (US); John Enhoffer, Mahwah, NJ (US)

(73) Assignees: BIONOMIC INDUSTRIES INC., Mahwah, NJ (US); UNIVERSITY OF MASSACHUSETTS, Boston, MA (US)

( * ) Notice: Subject to any disclaimer, the term of this patent is extended or adjusted under 35 U.S.C. 154(b) by 0 days.

(21) Appl. No.: 17/041,877

(22) PCT Filed: Mar. 27, 2019

(86) PCT No.: PCT/US2019/024313
§ 371 (c)(1),
(2) Date: Sep. 25, 2020

(87) PCT Pub. No.: WO2019/191249
PCT Pub. Date: Oct. 3, 2019

(65) Prior Publication Data
US 2021/0009913 A1 Jan. 14, 2021

Related U.S. Application Data

(60) Provisional application No. 62/649,335, filed on Mar. 28, 2018.

(51) Int. Cl.
*C10L 3/10* (2006.01)
*C10K 1/00* (2006.01)
(Continued)

(52) U.S. Cl.
CPC .............. *C10L 3/103* (2013.01); *B01D 53/52* (2013.01); *B01D 53/78* (2013.01); *B01D 53/96* (2013.01);
(Continued)

(58) Field of Classification Search
CPC ................ B01D 53/52; B01D 53/8612; B01D 2251/10; B01D 2251/602; B01D 2251/90;
(Continued)

(56) References Cited

U.S. PATENT DOCUMENTS 4,532,118 A * 7/1985 Tajiri ..................... C01B 17/05
252/191
5,417,946 A * 5/1995 Chou ..................... B01D 53/48
423/210
(Continued)

*Primary Examiner* — Timothy C Vanoy
(74) *Attorney, Agent, or Firm* — W. Patrick Quast

(57) ABSTRACT

A process and method for removing hydrogen sulfide from a gas and regenerating ferric ions consumed in the hydrogen sulfide scrubbing process at low pH. A two-scrubber regenerative chemical scrubbing system for removing hydrogen sulfide from a gas that provides an economical system for removing hydrogen sulfide from a gas at low pH without the need for chelating agents. An oxide of manganese is used as a catalyst to enhance the regeneration of ferric ions in an aqueous solution under acidic conditions in the presence of oxygen. The process may further include contacting the aqueous solution with a second gas comprising air to replenish the dissolved oxygen in the aqueous solution. The regenerated solution comprising ferric ions can be reused to treat additional hydrogen sulfide containing gases.

45 Claims, 15 Drawing Sheets

(51) Int. Cl.
*C01B 17/05* (2006.01)
*B01J 23/34* (2006.01)
*B01D 53/96* (2006.01)
*B01D 53/78* (2006.01)
*B01D 53/52* (2006.01)

(52) U.S. Cl.
CPC ............... *B01J 23/34* (2013.01); *C01B 17/05* (2013.01); *C10K 1/004* (2013.01); *B01D 2251/10* (2013.01); *B01D 2257/304* (2013.01); *C10L 2290/545* (2013.01)

(58) Field of Classification Search
CPC .... B01D 2255/20738; B01D 2257/304; B01D 2258/02; B01D 53/78; B01J 8/00; B01J 19/00; B01J 2219/00; C01B 17/04; C01B 17/0495; C01B 17/05; C10L 3/10; C10L 3/103; C10K 1/00
See application file for complete search history.

(56) References Cited

U.S. PATENT DOCUMENTS

| | | | | |
|---|---|---|---|---|
| 5,472,633 | A | * | 12/1995 | Griffin, Jr. ............. B01D 53/52 252/184 |
| 5,698,171 | A | * | 12/1997 | Trauffer ................. B01D 53/52 423/220 |
| 5,730,784 | A | * | 3/1998 | Smith ................... B03D 1/1493 95/181 |
| 2017/0232287 | A1 | * | 8/2017 | Safarzdeh-Amiri ......................... C01B 17/0434 423/576.8 |
| 2020/0086292 | A1 | * | 3/2020 | Barrientos Ju Rez ...................... B01J 23/889 |

* cited by examiner

PROCESS FOR HYDROGEN SULFIDE SCRUBBING AND METHOD FOR FERRIC ION REGENERATION

CROSS-REFERENCE TO RELATED APPLICATION

The present application claims the benefit of priority to U.S. Provisional Application Ser. No. 62/649,335, filed on Mar. 28, 2018, which is incorporated herein by reference in its entirety.

BACKGROUND

Field of Invention

The present invention relates to systems and processes for treating gas containing hydrogen sulfide by removing hydrogen sulfide through iron-based liquid redox sulfur recovery. In particular, this invention relates to more economical methods of treating gases containing hydrogen sulfide to effectively enhance the regeneration of ferric ions under acidic conditions.

Discussion of the Background

Hydrogen sulfide ($H_2S$) contaminated biogas and syngas generated from landfills, farm wastes, wastewater treatment facilities, solid waste and other biomass fuel sources are valuable and renewable energy and feedstock resources if properly processed. Otherwise they are a serious source of air pollution that emits greenhouse gases and ultimately cause global warming. Removal of hydrogen sulfide ($H_2S$) is an essential step for processing of such gases. There are also many additional hydrogen sulfide emission sources at petroleum refineries, pulp and paper, chemical, metal/metallurgical facilities and other industrial processes that need to control this air pollutant to meet federal and state toxic air emission regulations and standards in accordance with the Clean Air Act.

Chemical scrubbing processes dominate the market for $H_2S$ emission control and biogas upgrading. In general, these processes utilize chemical reactions, such as neutralization or oxidation-reduction (redox) reactions to enhance absorption of $H_2S$. Scrubbing solutions with caustics, oxychlorine compounds, ozone, potassium permanganate, hydrogen peroxide and others were applied for the application. These are once through processes. Inevitably, the chemical consumption, chemical cost and/or operating costs render the processes uneconomical.

Extensive research was conducted in the 1970s and 1980s to develop regenerative chemical scrubbing processes for $H_2S$ removal. The goal was to oxidize $H_2S$ to elemental sulfur with oxygen in the air. However, at ambient temperature and atmospheric pressure, the reaction rate between $H_2S$ and oxygen is low. Liquid redox sulfur recovery (LRSR) processes were therefore developed.

Oxidation of $H_2S$ in the LRSR process is carried out by an intermediate redox couple. There are $V^{+5}/V^{+4}$, $Fe^{+3}/Fe^{+2}$, $Co^{+3}/Co^{+2}$ and $As^+/As^{+3}$ identified as redox couples for LRSR processes. The use of vanadium dominated in the 1980s, but eventually declined due to chemical degradation and environmental problems associated with vanadium. Considering the effectiveness and low toxicity, the iron-based process has gradually gained the market share. However, there are at least two major hurdles in iron-based LRSR processes, including: (1) Ferric ions ($Fe^{+3}$) dissolve only in acidic solution, around pH 1; and (2) at low pH under acidic conditions, the reaction rate for ferric ions regeneration, i.e., oxidation rate of ferrous ions ($Fe^{+2}$), is very low. To overcome this contradictory problem, all existing LRSR processes operate between pH 6 and 8. Due to the high pH, industry uses organic chelating agents, such as ethylenediaminetetraacteic acid (EDTA), diacetylenetriaminepentaacetic acid (DTPA), or nitrilotriacetic acid (NTA), to keep ferric ions in the solution. However, chelating agents degrade in the redox process and have to be replenished during the operation, thereby increasing the financial burden as well.

Another drawback is that the scrubbing solution absorbs carbon dioxide ($CO_2$) along with $H_2S$. For example: Biogas is typically composed of 60% methane, 1 to 2% $H_2S$, and 30 to 40% $CO_2$; syngas, e.g., syngas derived from biomass, coal and waste can contain from 9 to 23% $CO_2$; sour gas from natural gas can contain up to 65% $CO_2$. A significant amount of caustic is consumed to neutralize the carbonic acid produced in the process in order to maintain the operating pH between 6 and 8.

Conventional processes have been limited to once-through chemical scrubbing processes, including methods described in Chen et al. (Chen, Luke, James Huang, and Chen-Lu Yang, Absorption of $H_2S$ in NaClO Caustic Aqueous Solution, *Environmental Progress*, Vol. 20, No. 3, pp. 175-181, 2001), which is incorporated herein by reference in its entirety. Chen et al. describe a method of scrubbing hydrogen sulfide from air streams using sodium hydroxide and sodium hypochlorite for $H_2S$ absorption and oxidation at high pH, for example a pH of 11. Petroleum industry owns most of the patents that utilize organic solvents, such as diethanolamine (DEA), monoethanolamine (MEA), methyldiethanolamine (MDEA), diisopropanolamine (DIPA), aminoethoxyethanol (DGA) to remove $H_2S$ from their sour gas streams. Most patents related to iron-based LRSR processes or so called chelated iron processes were issued in the 1970s and 1980s. Prior to the invention of the present disclosure, there was no successful process to remove $H_2S$ and regenerate ferric ions at low pH.

SUMMARY OF THE INVENTION

The present disclosure overcomes the disadvantages of prior systems and methods by providing a method and system that effectively enhances the regeneration of ferric ions in acid solutions such that the entire hydrogen sulfide scrubbing process can be operated under acidic conditions at high efficiency. At low pH, ferric ions are readily dissolved in the solution, thus the use of chelating agent may be eliminated. At the same time, absorption of carbon dioxide is avoided. Another benefit is that there is no need to add caustic to neutralize the carbonic acid produced by $CO_2$ absorption.

To avoid using chelating agents, the scrubbing solution has to be maintained at low pH. Hydrogen sulfide has a dissociation constant of $K_{a1}=9.1\times10^{-8}$ M with a solubility of 4 g/L. The pH of a saturated aqueous solution of $H_2S$ can be calculated as 4.02. High pH in the solution favors $H_2S$ absorption, because it provides an extra pathway, neutralization, to remove $H_2S$ from the equilibrium. At low pH, dissociation of $H_2S$ to bisulfide ions is reduced, and thus the accumulation of $H_2S$ in the solution prevents the dissolution of $H_2S$ from gas phase into solution. The absorption of $H_2S$ in an acidic Fe(III) ion containing solutions relies on the Fe(III) ions to provide an irreversible reaction to prevent the accumulation of $H_2S$. Therefore, $H_2S$ absorption rate into the aqueous phase is a directly dependent of the reaction rate between H₂S and the concentration of Fe(III) ions in solution.

According to one object of the present invention, a process for scrubbing hydrogen sulfide from a hydrogen sulfide containing gas uses oxygen to oxidize H$_2$S into elemental sulfur (S°), as stated in Equation (1).

$$H_2S_{(g)} + \tfrac{1}{2}O_{2(g)} \rightarrow S° + H_2O \qquad (1)$$

According to another aspect of the present invention, a method is provided for removing sulfur from hydrogen sulfide through oxidation of H$_2$S carried out by a Fe$^{+3}$/Fe$^{+2}$ redox couple followed by regeneration of the ferric ions. The method includes reacting a hydrogen sulfide gas with an aqueous solution comprising ferric ions under conditions sufficient to dissolve the hydrogen sulfide in the solution to produce bisulfide and hydronium ions, as stated in Equations (2) and (3).

$$H_2S_{(g)} + H_2O \leftrightarrow H_2S_{(l)} \qquad (2)$$

$$H_2S_{(l)} \leftrightarrow H^+ + HS^- \qquad (3)$$

The method includes reacting the bisulfide with ferric ions in the solution to produce elemental sulfur and ferrous ions, as stated in Equation (4).

$$HS^- + 2Fe^{+3} \rightarrow S° + 2Fe^{+2} + H^+ \qquad (4)$$

The method further includes oxidizing the ferrous ion with dissolved oxygen in solution in the presence of an oxide of manganese as a catalyst to regenerate ferric ions in the aqueous solution, as stated in Equations (5) and (6).

$$\tfrac{1}{2}O_{2(g)} + H_2O_{(l)} \leftrightarrow \tfrac{1}{2}O_{2(l)} \qquad (5)$$

$$2Fe^{+2} + \tfrac{1}{2}O_{2(l)} + H_2O \rightarrow 2Fe^{+3} + 2OH^- \qquad (6)$$

Another aspect of the invention is a process for treating hydrogen sulfide containing gas by contacting an aqueous solution containing ferric ions with a hydrogen sulfide-containing gas and dissolving the hydrogen sulfide in the aqueous solution. The aqueous solution may have a pH of about 6.0 or less. The dissolved hydrogen sulfide reacts with the ferric ions in the aqueous solution to produce ferrous ions and sulfur, resulting in sulfur that is insoluble in solution. The process may include a catalyst to enhance the regeneration of ferric ions in the aqueous solution. The ferric ion regeneration may include oxidation of ferrous ions with dissolved oxygen in the aqueous solution. The catalyst used to enhance the regeneration may be an oxide of manganese. The process may further include contacting the aqueous solution with a second gas comprising air to replenish the dissolved oxygen in the aqueous solution.

Another aspect of the present disclosure is a process for treating a hydrogen sulfide containing gas comprising: (i) contacting an aqueous solution containing ferric ions with the gas; (ii) dissolving the hydrogen sulfide from the gas in the aqueous solution, and reacting the dissolved hydrogen sulfide with the ferric ions in the aqueous solution to produce ferrous ions and sulfur, wherein the sulfur is insoluble in solution; (iii) removing the sulfur from the aqueous solution by solid-liquid separation; (iv) contacting the ferrous ion-containing aqueous solution with an oxide of manganese; and (v) regenerating the ferric ions in the aqueous solution. The ferric ions may be regenerated by contacting the aqueous solution with a second gas comprising oxygen and dissolving the oxygen in the solution. In certain aspects, the oxide of manganese may be manganese(II) oxide, MnO, Manganese(II,III) oxide, Mn$_3$O$_4$, Manganese(III) oxide, Mn$_2$O$_3$, manganese dioxide, (manganese(IV) oxide), MnO$_2$, Manganese(VI) oxide, MnO$_3$, and Manganese(VII) oxide, Mn$_2$O$_7$.

An aspect of the present invention also includes a method of removing sulfur from hydrogen sulfide and regenerating ferric ions, including: (i) reacting a hydrogen sulfide containing gas with an aqueous solution comprising ferric ions under conditions sufficient to dissolve the hydrogen sulfide in the solution to produce bisulfide and hydronium ions; (ii) reacting the bisulfide with ferric ions in the solution to produce sulfur and ferrous ions; and (iii) oxidizing the ferrous ion in the presence of an oxide of manganese to regenerate ferric ions in the aqueous solution, wherein the aqueous solution comprises dissolved oxygen from the air.

According to another aspect of the present invention is a catalytic regenerative chemical scrubbing system for treating hydrogen sulfide containing gas comprising a solid-liquid separator, a first scrubber and a second scrubber. The first scrubber may include an inlet port capable of introducing a gas comprising hydrogen sulfide and an outlet port connected to the solid-liquid separator through a first circulating pump. The second scrubber may include a first inlet port capable of introducing an aqueous solution comprising ferrous ions and a second inlet port for introducing a compressed gas. The second scrubber may also include a packed bed of an oxide of manganese. The solid-liquid separator may include a first outlet port connected to the first inlet port of the second scrubber through a second circulating pump. In some aspects of the present invention, the first scrubber may be selected from a packed bed, bubble column, spray, or sieve tray tower. In certain aspects, the second scrubber may include a liquid sprayer system.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

DETAILED DESCRIPTION

Figure 1:
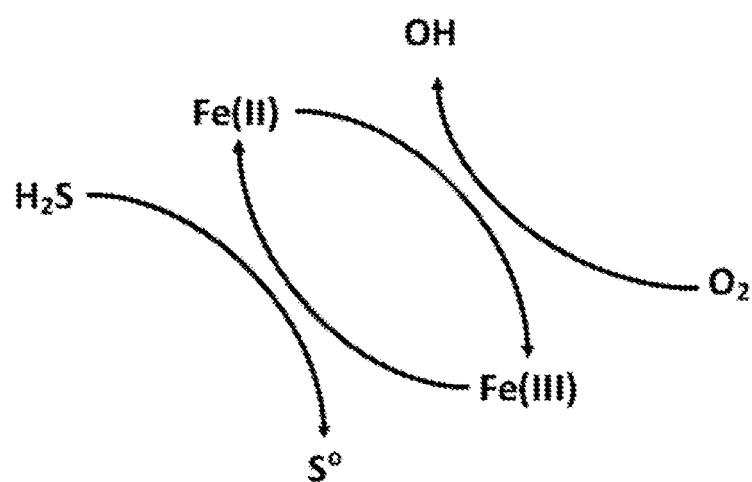
FIG. 1 illustrates the overall chemical reaction for the iron-based two-scrubber regenerative chemical scrubbing system for H$_2$S removal.

The following detailed description includes references to the accompanying drawings, which form part of the detailed description. The drawings show, by way of illustration, a specific embodiment by which the present invention may be practiced. The embodiments herein may be combined, other embodiments may be utilized, or changes may be made based on structural, chemical, or other logical changes that are within the scope of the present invention. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Therefore, the following detailed description is not to be taken as limiting in scope.

In understanding the scope of the present disclosure, the terms "including" or "comprising" and their derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps. It is understood that reference to any one of these transition terms (i.e. "comprising," "consisting," or "consisting essentially") provides direct support for replacement to any of the other transition term not specifically used. For example, amending a term from "comprising" to "consisting essentially of" would find direct support due to this definition.

The term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within 30%, 20%, 10% or 5% of the stated value.

Generally herein, the term "or" includes "and/or."

As used herein, a plurality of compounds or steps may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

It will be understood that, although the terms "first," "second," "third" etc. may be used herein to describe various elements, components, and/or sections, these elements, components, and/or sections should not be limited by these terms. These terms are only used to distinguish one elements, components, and/or sections from another elements, components, and/or sections. Thus, "a first element," "component," or "section" discussed above or below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The inventors have demonstrated that, surprisingly, manganese oxide can be used to effectively enhance the regeneration of ferric ions under acidic conditions. As described above, ferric ions more readily dissolve under acidic conditions, thereby eliminating the need for extensive amounts of chelating agent to enhance iron solubility. Thus, the use of an oxide of manganese to enhance the regeneration of ferric ions under acidic conditions allows the entire hydrogen sulfide scrubbing process, including ferric ion regeneration, to take place at low pH. According to the present disclosure, it has surprisingly been found that small amounts of chelating agents can be used to further enhance the ferric ion regeneration rate, thereby making the methods and systems of the present disclosure unexpectedly and substantially more efficient than previously known methods.

Metal oxides were tried at neutral pHs with success for a few of the tested metal oxides in B. Engin et al., Removal of Ferrous Ion in Synthetic Waters by Catalytic Air Oxidation, (2009), 21(3) Asian Journal of Chemistry, 2067-72, but there is no report of successful use of metal oxides at low pHs for catalyzing the rate of ferrous ion oxidation. The inventors of the present invention surprisingly found that manganese oxide efficiently catalyzes the rate of ferrous ion oxidation at low pH in the presence of air. This ability to catalyze ferrous ion oxidation at low pH is not generally shared among transition metal oxides. For example, Lahav et al., Kinetic Investigation of low-pH Fe(II) oxidation and development of a method for Fe(III) regeneration as part of a process aimed at $H_2S_{(g)}$ removal, 2009, Research report submitted to Grand Water Research Institute, 1-101, reported that copper and phosphate failed to efficiently catalyze ferrous ion oxidation at low pH. The inventors have tested and found that oxides of magnesium and nickel fail to provide the surprising effect demonstrated in the present invention, namely, efficiently enhancing the rate of ferric ion regeneration at low pH in the presence of oxygen, e.g., from the air.

It will be readily apparent to those skilled in the art reading the present disclosure that ferric ion regeneration during the hydrogen sulfide scrubbing process described herein is dependent on: (1) the pH of the scrubbing solution; (2) the amount of manganese oxide catalyst used in the system; (3) the amount of iron dissolved in solution; (3) the amount of chelating agent; and (4) the contact time of the hydrogen sulfide gas with the scrubbing solution. Therefore, one or all of the foregoing parameters may be adjusted based on the desired need of the application to optimize the ferric ion regeneration and hydrogen sulfide gas absorption into the aqueous phase during the processing steps.

The inventors of the present disclosure have found through experimentation that the rate of hydrogen sulfide gas processing can be increased by adjusting one or more of the foregoing parameters. In some aspects the pH of the scrubbing solution may be increased to increase the rate and amount of hydrogen sulfide dissolution into the aqueous phase during the hydrogen sulfide scrubbing process. In other aspects, the ferric ion regeneration rate may be increased in order to increase the rate and amount of hydrogen sulfide dissolution into the aqueous phase during the hydrogen sulfide scrubbing process. The amount of catalyst may also be decreased to decrease the amount of ferric ion deposition on the catalyst at higher pH, thereby enhancing the amount of ferric ions in solution to process hydrogen sulfide. Thus, the present disclosure provides a system and apparatus for treating hydrogen sulfide containing gas and ferric ion regeneration that can be more easily adapted to the needs of various process scales and running costs.

In one aspect, the present disclosure provides an iron-based two-scrubber regenerative chemical scrubbing system for removing sulfide from hydrogen sulfide containing materials. In some embodiments, e.g., as shown in FIG. 1, hydrogen sulfide will react with ferric ions under acidic conditions in a first scrubber to produce ferrous ions and elemental sulfur. The process may involve oxidizing $H_2S$ to elemental sulfur using ferric Fe(III) ions in solution to produce ferrous Fe(II) ions and elemental sulfur. The process may further include regenerating the Fe(II) ions to Fe(III) ions using oxygen, e.g., from the air. In some embodiments a solid liquid separation process or apparatus will be used to separate the different phases of material, namely the insoluble elemental sulfur from the aqueous solution comprising ferrous ions. In some embodiments, the aqueous solution comprising ferrous ions and with the elemental sulfur removed from the solution will be transferred to a second scrubber system including manganese oxide to catalyze the regeneration of ferrous ions to ferric ions via oxidation by dissolved oxygen in the aqueous solution. In some embodiments compressed gas comprising air may be injected into the second scrubber system to replenish the dissolved oxygen in the aqueous solution. In certain aspects, the pH of the aqueous solution is acidic. In certain aspects, approximately the same pH is used in both scrubbing systems. However, it is not required that the pH be the same in both scrubbers. In one aspect, the aqueous solution with regenerated ferric ions will be transferred from the second scrubber back to the first scrubber where it can be used to process additional hydrogen sulfide containing materials, as described above.

Figure 2:
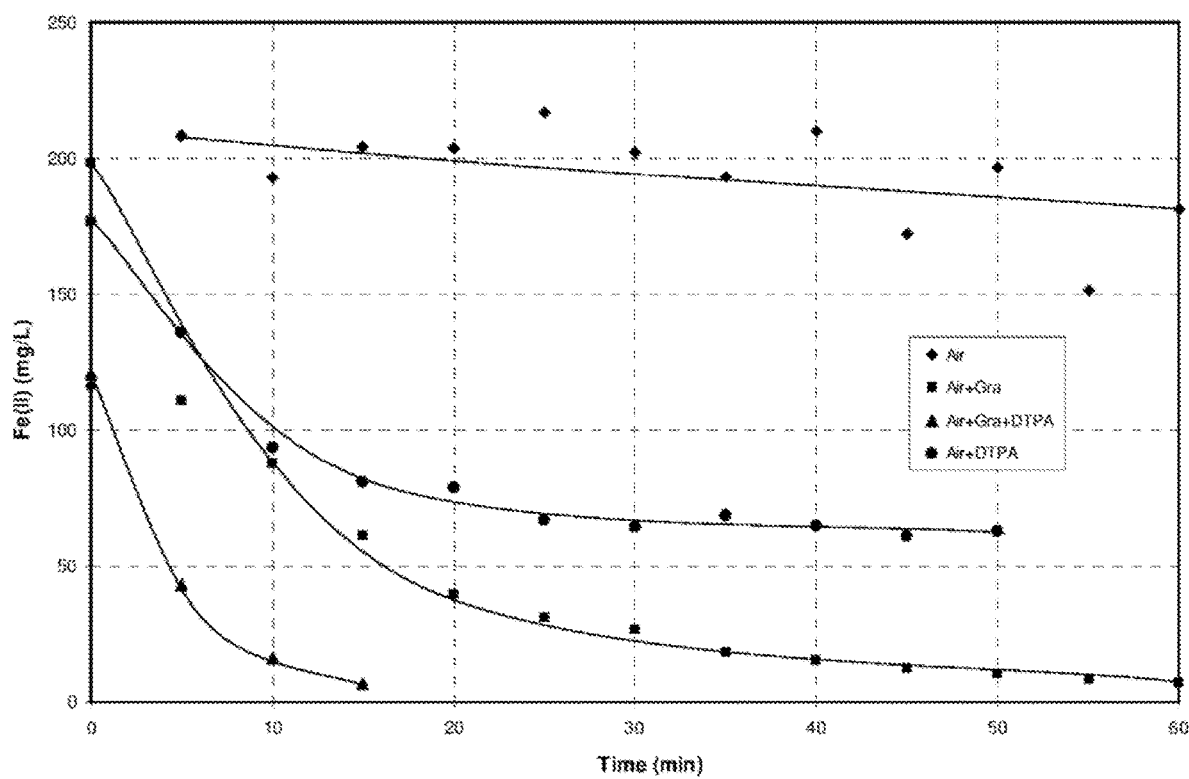
FIG. 2 is a graph showing the results of comparative oxidation of ferrous ions with oxygen from the air in an acid solution with and without a chelating agent or MnO$_2$ catalyst. Four conditions are shown for the measured ferric ion regeneration in the presence of oxygen from the air including, an aqueous solution in the presence of air alone (♦), manganese oxide granulates (■), diacetylenetriaminepentaacetic acid (DPTA) (●), or manganese oxide granulates and DPTA (▲). The amount of ferrous ion depletion, i.e., ferric ion regeneration, is measured in mg/L of Fe(II) as shown on the y-axis. The depletion rate is measured in minutes, as shown in the x-axis. The reaction was measured at a pH of 4.5.

A person skilled in the art will understand that the results shown in FIG. 2 demonstrate the presence of manganese oxide granulates (GRA) enhances ferrous Fe(II) ion oxidation to ferric Fe(III) ions, shown as a depletion in the amount of ferrous Fe(II) ions in FIG. 2. Kinetic tests were conducted monitoring the rate of Fe(II) depletion in a system comprising an aqueous solution comprising ferrous ions and air. The results show that including manganese oxide granules in the presence of air (■) reduces the time required to deplete ferrous ions via oxidation, i.e., regenerate ferric ions, at significant levels compared to DPTA (●). A person skilled in the art will appreciate that the results further show that including manganese oxide granules and a small amount of chelating agent (▲) can reduce the time required to regenerate ferric ions even further. Surprisingly, the presence of the chelating agent plus manganese oxide granules synergizes the rate of ferrous ion consumption in the presence of air.

Figure 3:
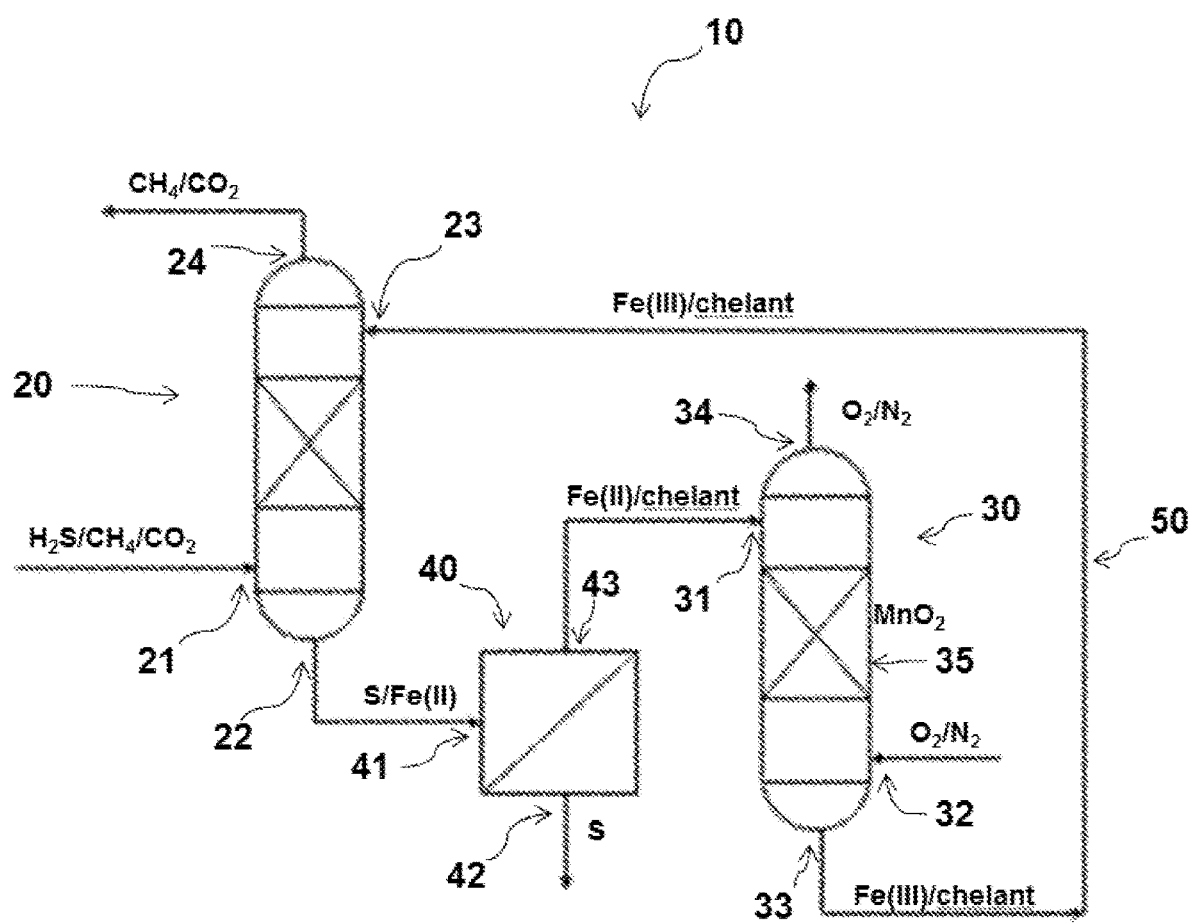
FIG. 3 is a schematic view illustrating elements of the catalytic regenerative chemical scrubbing system for treating a gas containing hydrogen sulfide.

The schematic drawing in FIG. 3 shows the catalytic regenerative chemical scrubbing system 10 of the present disclosure, including a solid-liquid separator 40, a first scrubber 20 and a second scrubber 30. The first scrubber 20 may include an inlet port 21 capable of introducing a gas comprising hydrogen sulfide and an outlet port 22 connected to the solid-liquid separator 40 through a first circulating pump (not shown). The second scrubber 30 may include a first inlet port 31 capable of introducing an aqueous solution comprising ferrous ions and a second inlet port 32 for introducing a compressed gas, for example air. The second scrubber 30 may also include a packed bed of manganese oxide 35. The solid-liquid separator 40 may include a first inlet port 41 for introducing an aqueous solution comprising sulfur and ferrous ions into the solid-liquid separator. In some aspects, the solid-liquid separator may include a first outlet port 43 connected to the first inlet port 31 of the second scrubber 30 through a second circulating pump (not shown). In some aspects, the solid-liquid separator may include an outlet port 42 capable of dispensing the sulfur material separated from the aqueous solution.

In certain aspects, the second scrubber 30 may include an outlet gas port 34. In certain aspects, the catalytic regenerative chemical scrubbing system 10 may include a first scrubber 20 with an inlet port 23 connected to an outlet port 33 of the second scrubber 30 allowing the aqueous solution comprising regenerated ferric ions to be recirculated back to the first scrubber 20 to process additional hydrogen sulfide containing gas. In some aspects, the first scrubber 20 may further include an outlet port 24, for example, to release methane and carbon dioxide gas from the first scrubber.

In certain aspects, raw gas comprising hydrogen sulfide is initially fed into the first scrubber 20 of the catalytic regenerative chemical scrubbing system 10 through the port 21 in order to process the hydrogen sulfide containing gas according to Equations (2)-(4), above. The solution is then fed into a solid-liquid separator 40 in order to separate the insoluble elemental sulfur from the aqueous solution comprising ferrous ions. The aqueous solution is then fed into the second scrubber 30 in order to regenerate the ferric ions in solution. In some aspects, the aqueous solution comprising ferrous ions may be sprayed onto a packed bed of manganese oxide 35 in the second scrubber 30. In addition, compressed air may be injected into the second scrubber 30 via a gas inlet port 32 in order to replenish the dissolved oxygen in the solution. In certain aspects, the regenerated aqueous solution will be transferred from the second scrubber 30 back to the first scrubber 20 through a liquid supply means 50.

It will be appreciated by those skilled in the art that a liquid supply means may be any means of supplying liquid between the components in the catalytic regenerative chemical scrubbing system 10. For example, the liquid supply means may comprise a tube, a pipe, a hose, or any other means of supplying liquid. Further, the materials of the liquid supply means may be any material known in the art that may be used for transporting acidic solutions comprising iron ions and metal oxides without corrosion.

In some embodiments the catalytic regenerative chemical scrubbing system 10 will also include a hydrogen sulfide analyzer to measure the inlet and outlet concentrations of hydrogen sulfide entering and exiting the scrubbers. During operation of the scrubbing system a continuous sample may be drawn into the detector to measure the amount of gas phase hydrogen sulfide. Those skilled in the art will recognize that such detectors may include UV photo ionization detectors, for example a Multi Rae PGM-50 analyzer may be used, although the present disclosure is not limited by the type of detector.

In some embodiments the catalytic regenerative chemical scrubbing system 10 will also include a pH monitoring and dispensing system. The pH of the system can be monitored and controlled by the pH monitor/metering pump.

Aspects of the present disclosure may further include circulating pumps and flow meters attached to the system for controlling the flow of aqueous solution between the scrubbers and the solid-liquid separator. The present disclosure is not limited by the type of circulating pump or flow meters used for the liquid flow control and those skilled in the art will appreciate the types of devices useful for these purposes. The placement of the circulating pumps or flow meters within the system may depend to the type of operations.

The dimensions of the components in the catalytic regenerative chemical scrubbing system 10 can be modified based on the scale of the process. For example, the size and capacity of the scrubbers and solid-liquid separator can be selected based on large-scale commercial operations or small scale waste decontamination. Those skilled in the art will recognize that the system of the present disclosure can by scaled for use in large-scale industrial operations, including electric power plants, oil refineries, including petroleum and petrochemical production and refinement operations, oil and gas extraction operations, pulp and paper mills, mining, metallurgical processes, wastewater treatment plants, pig farms and confined animal feeding operations, cement kilns, landfills, sulfur products production, asphalt production and storage, or for smaller scale use, for example family farms or other sources of gas containing hydrogen sulfide where industrial scale is not required.

In some aspects, the methods and systems of the present disclosure may be used to reduce or remove hydrogen sulfide from various sources containing hydrogen sulfide, including natural gas, coke oven gas, and pyrolysis gas, landfill material, fuel gases, sour gases, chemical process gases, or waste-treatment material.

Figure 4:
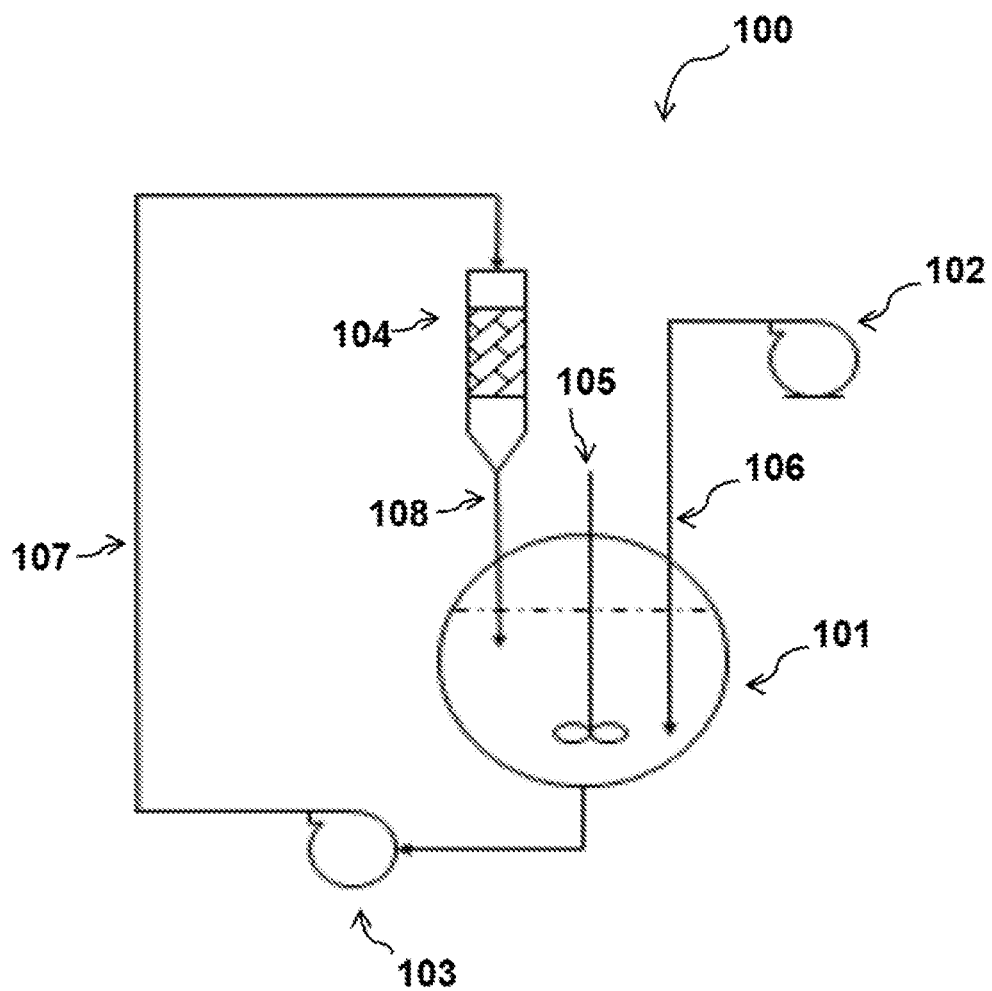
FIG. 4 is a schematic view illustrating elements of system for regenerating ferric ions from ferrous ions in an acidic solution.

Contemplated within the present disclosure is a system for regenerating ferric ions from ferrous ions using a system described in FIG. 4. The ferric ion regeneration system 100 uses a reaction vessel 101 provided with a stirring means 105. The reaction vessel 101 is connected to a gas compressor 102 by a gas supply means 106. The reaction vessel 101 is further connected to a column 104 containing a packed bed of manganese oxide through a liquid supply means 107 and a pump 103. The column 104 is connected to the reaction vessel through a liquid supply means 108.

In some embodiments, the pH of the solution may be a pH of 8.0 or below, or the pH may be about a pH of 6.0 to about pH 8.0. In some embodiments the pH of the solution may be an acidic pH. Those skilled in the art will understand that an acidic pH is a pH less than a pH of about 7.0. In still further embodiments the pH of the solution may be a pH of about 6.0 or less, or a pH of about 4.5 or less, or a pH of about 3.0 or less, or a pH of about 2.0 or less. In some embodiments the pH may be a about pH 1.0. The present disclosure is not limited by the specific pH values listed herein and may use any pH value between the foregoing ranges.

The pH of the solution may be adjusted using concentrated acid or base. In preferred embodiments the pH may be adjusted by adding concentrated sulfuric acid.

One aspect of the disclosure is to use an oxide of manganese to enhance the regeneration rate of the ferric ions in solution. The oxide of manganese used in the present disclosure may be manganese(II) oxide, MnO, Manganese (II,III) oxide, $Mn_3O_4$, Manganese(III) oxide, $Mn_2O_3$, manganese dioxide, (manganese(IV) oxide), $MnO_2$, Manganese (VI) oxide, $MnO_3$, and Manganese(VII) oxide, $Mn_2O_7$. The manganese oxide may be present as granulates, including a packed bed of manganese oxide or free granulates.

The amount of the catalyst comprising an oxide of manganese may be adjusted according to the desired application. In some embodiments, the catalyst comprising an oxide of manganese can be added based on a weight by weight (w/w) ratio of manganese oxide to ferric or ferrous ions, based on hydrogen sulfide mass loading, or a set regeneration time.

Ferric ions in the present disclosure may be derived from ferric sulfate, although the present disclosure is not limited thereto. The use of other ferric salts and complexes, e.g., halides, phosphates, nitrates, acetate, propionate, butyrate, formate, ammonium sulfate, citrate, ammonium citrate, are contemplated within the scope of the present disclosure. The amount of ferric ions in solution may be adjusted according to the needs of the application. In some embodiments the concentration of ferric ions in solution is about 1000 mg/mL or less. In some embodiments the concentration of ferric ions in the solution may be at a concentration of about 200 mg/mL or less, or about 140 mg/mL or less, or about 100 mg/mL to about 200 mg/mL. In some embodiments, the concentration of ferric ions may be about 100 mg/mL to about 140 mg/mL.

In yet another aspect of the disclosure, the regeneration rate of the ferric ions in the aqueous solution in the presence of catalyst, e.g., manganese oxide may be increased even further by adding a chelating agent. In some aspects of the present disclosure, the chelating agent may be at least one of ethylenediaminetetraacteic acid (EDTA), diacetylenetriaminepentaacetic acid (DTPA), or nitrilotriacetic acid (NTA), or a combination thereof.

In some embodiments, the consumption rate of ferric ions is proportional to the regeneration rate. The present disclosure provides a method and process for treating hydrogen sulfide in a gas wherein at least 75% of the ferrous ions are regenerated to ferric ions relative to the total concentration of ferrous ions in the aqueous solution. In some embodiments, at least 95% of the ferrous ions relative to the total concentration of ferrous ions are regenerated to ferric ions in 60 minutes after contacting the ferrous ion-containing aqueous solution with an oxide of manganese. In some embodiments the amount of the ferrous ions regenerated to ferric ions in 50 minutes using manganese oxide in the presence of air is more than twice the amount regenerated using a chelating agent alone in the presence of air. In certain aspects, at least 95% of the ferrous ions relative to the total concentration of ferrous ions are regenerated to ferric ions in 20 minutes after contacting the ferrous ion-containing aqueous solution with an oxide of manganese. In certain aspects, a synergistic increase in the rate of ferrous ions regenerated to ferric ions is achieved by using manganese oxide with a chelating agent in the presence of air.

In some embodiments the temperature used in the process and method of the present disclosure is ambient temperature. A person skilled in the art will understand ambient temperature to mean a range of about 20° C. to about 30° C., e.g., 20° C., 21° C., 22° C., 23° C., 24° C., 25° C., 26° C., 27° C., 28° C., 29° C., 30° C. or any fractional temperature within the range. In some aspects, the temperature may be about 25° C. Still other temperatures above 30° C. and below 20° C. may be used in certain aspects of the present disclosure.

The gas flow rates may vary depending on the scale of the system and commercial need. The gas flow rate may be in the range of 10 ft/min. to 300,000 ft/min. In some embodiments a gas flow rate in the range of 30 ft/min to 100,000 ft/min, 100 ft/min to 50,000 $ft^3$/min, 500 $ft^3$/min to 25,000 $ft^3$/min, or 300 $ft^3$/min to 900 $ft^3$/min may be used.

The present disclosure is not limited by the pressure used in the scrubbing system. However, the pressure used in the present disclosure may be atmospheric pressure. Those skilled in the art will understand that atmospheric pressure is about 1 atm (101 kPa; 760 Torr).

The system of the present disclosure may include a water supply system for controlling the amount of aqueous solution pumped through the catalytic regenerative chemical scrubbing system.

The following examples are merely illustrative of certain embodiments of the invention and cannot be considered as restricting it in any way.

EXAMPLES

Example 1

An experiment was carried out to test the rates of ferric ion regeneration under acidic conditions with and without chelating agents and manganese oxide. A bubble column was used to mix an aqueous solution comprising ferrous ions with air. The absorbent aqueous solution was contacted with air to dissolve oxygen into the solution. The concentration of ferrous ions in solution for each of the test conditions was between 100 mg/mL and 200 mg/L. The ferric ion regeneration measurement was conducted at a pH of 4.5 at room temperature and under atmospheric pressure for each of the test conditions. In the experiment an aqueous solution comprising ferrous ions was tested for the rate of ferrous Fe(II) depletion, i.e., oxidation/regeneration of ferrous ions to ferric Fe(III) ions, using four different conditions of the aqueous solution in the presence of air. The rate was measured for the aqueous solution comprising ferrous ions and air. For the second condition the rate was measured for the same solution including 20 mL or 40 g of manganese oxide granulates. The third condition included 0.3 grams of a diacetylenetriaminepentaacetic acid (DTPA) chelating agent. Finally, a fourth condition was tested using DPTA and manganese oxide granulates.

The results of Example, described above, are shown in FIG. 2. This figure shows that an aqueous solution including manganese oxide granulates is able to regenerate substantially more ferric ions in 50 minutes compared to a solution that uses a chelating agent alone. Moreover, the results in FIG. 2 show that the addition of a chelating agent to a solution comprising manganese oxide granulates regenerates nearly all the ferrous ions in solution in less than 20 minutes.

Example 2

A 500 mL aqueous solution containing 140 mg/L of Fe(II) ions was prepared by mixing ferrous sulfate with deionized water at a pH of 3.8. The pH of the solution was adjusted by adding sulfuric acid. The solution was subsequently circulated through a 40-gram manganese oxide catalyst bed at a circulation rate of 220 mL/min. Iron concentration in solution was measured over time for a total of 60 minutes.

Figure 5:
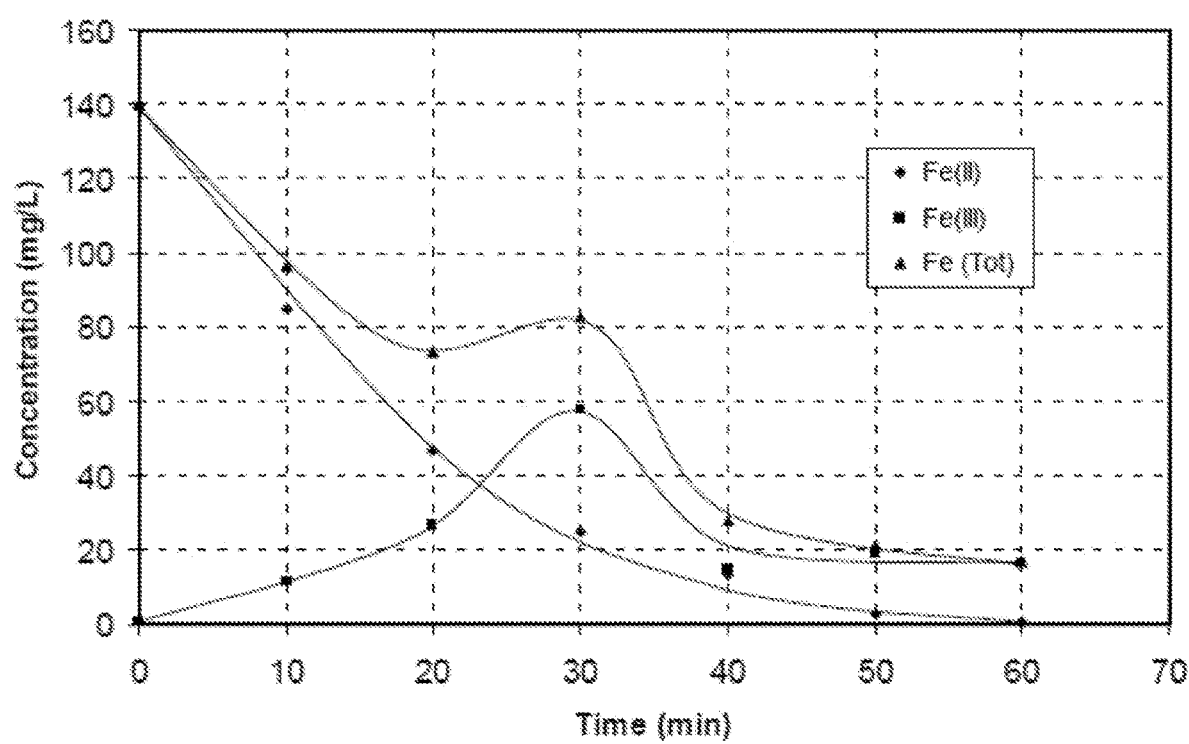
FIG. 5 is a graph showing the time-dependent concentration of Fe(II) (♦), Fe(III) (■), and total iron content (▲) in a hydrogen sulfide scrubbing solution in contact with a manganese oxide catalyst.
Figure 6:
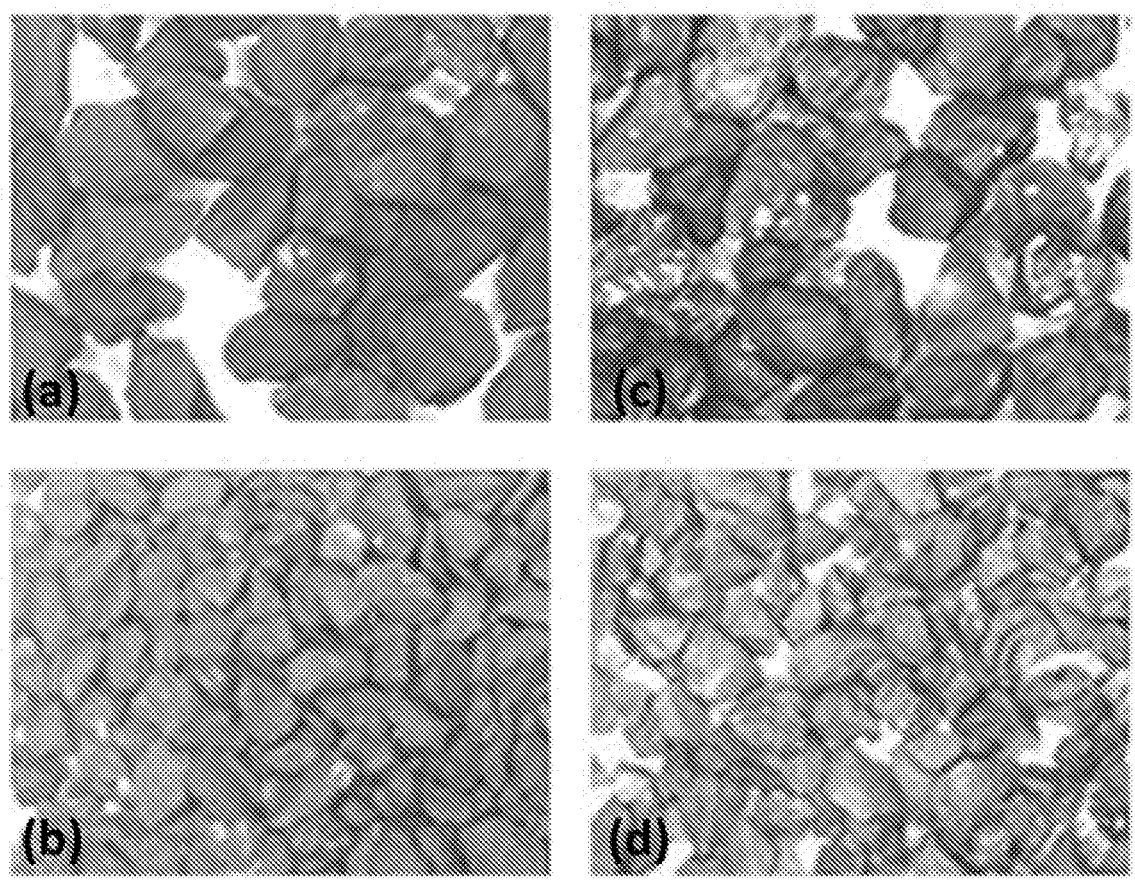
FIGS. 6a-d are images from an optical microscope showing virgin catalyst materials FIG. 6a and FIG. 6b and Ferric ions deposition on the surface of catalyst samples recovered from the packed column after Fe(III) ion regeneration experiments were completed FIG. 6c and FIG. 6d.

The results of the first 60 minute run are shown in FIG. 5. The concentration of Fe(II) ions in solution steadily decreased with time until totally consumed at 60 minutes. The Fe(III) ion concentration increased with time up to 30 minutes and then began to decrease along with total iron content dissolved in solution. As shown in FIGS. 6a-d, the decrease in the amount of dissolved Fe(III) and total iron content after 30 minutes is due to ferric ion deposition on the manganese oxide catalyst surface. Specifically, FIGS. 6a and 6b show photographic images of virgin catalyst materials (GranuSpec and Pyrolox) taken using an optical microscope. By comparison FIGS. 6c and 6d show images of catalyst materials recovered from the packed column after Fe(III) ion regeneration experiments. On black and white images, deposition of Fe(III) show up as white deposits on the catalyst materials after regeneration experiments, which are not readily observed on the virgin materials.

Example 3

An aqueous solution containing Fe(II) ions was prepared as described in Example 2, except the solution was adjusted to pH 2.8 using sulfuric acid. The solution was subsequently circulated through a 40-gram manganese oxide catalyst bed at a circulation rate of 220 mL/min. Iron concentration in solution was measured over time for a total of 60 minutes.

Figure 7:
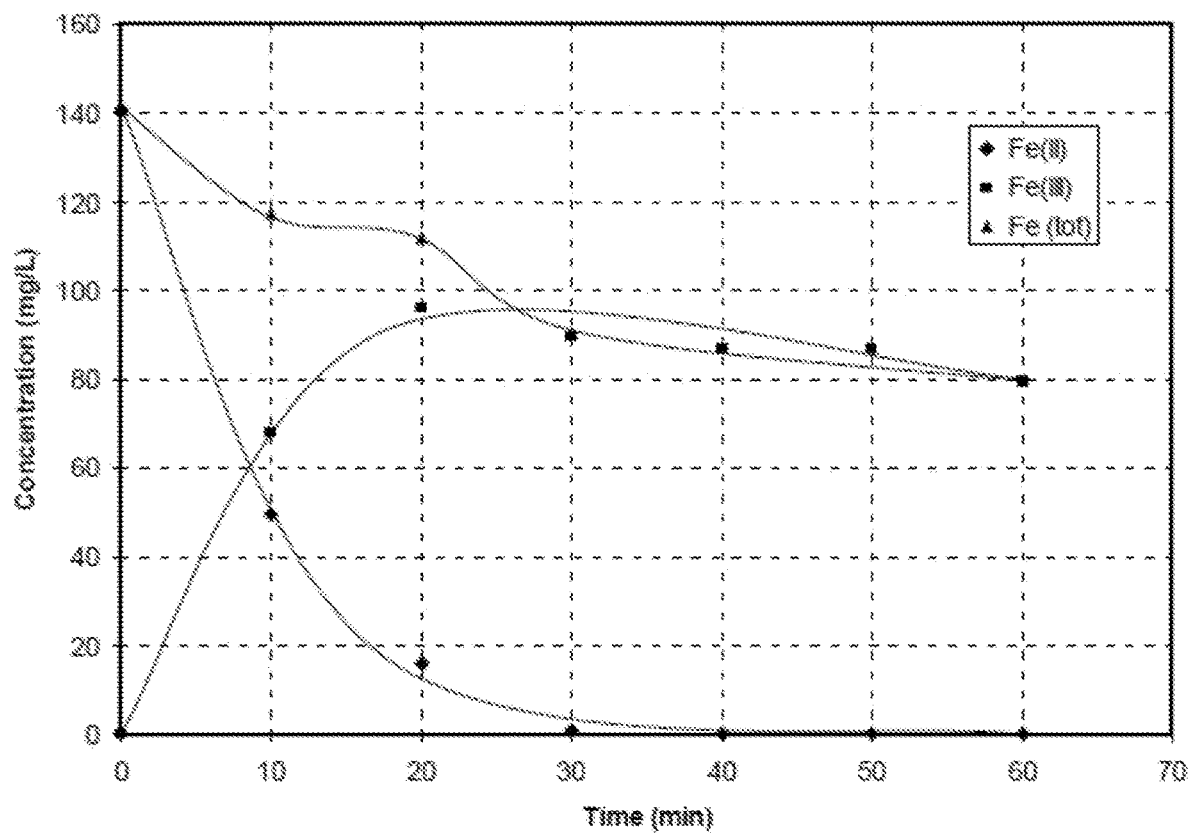
FIG. 7 is a graph showing regenerated Fe(III) ion retention in the solution at pH 2.8.

The results of the first 60 minute run are shown in FIG. 7. In this example, nearly all of the Fe(II) ions in solution circulating through the 40-g catalyst bed were converted to Fe(III) ions in 30 minutes. At the end of the operation 80 mg/L out of 140 mg/L total iron was retained in the solution, i.e., about 60% of regenerated Fe(III) ions remained in solution.

Example 4

An aqueous solution containing Fe(II) ions was prepared as described in Example 2, except the starting concentration of Fe(II) ions was about 120 mg/L and the solution was adjusted to pH 2.0 using sulfuric acid. The solution was subsequently circulated through a 40-gram manganese oxide catalyst bed at a circulation rate of 220 mL/min. Iron concentration in solution was measured over time for a total of 60 minutes.

Figure 8:
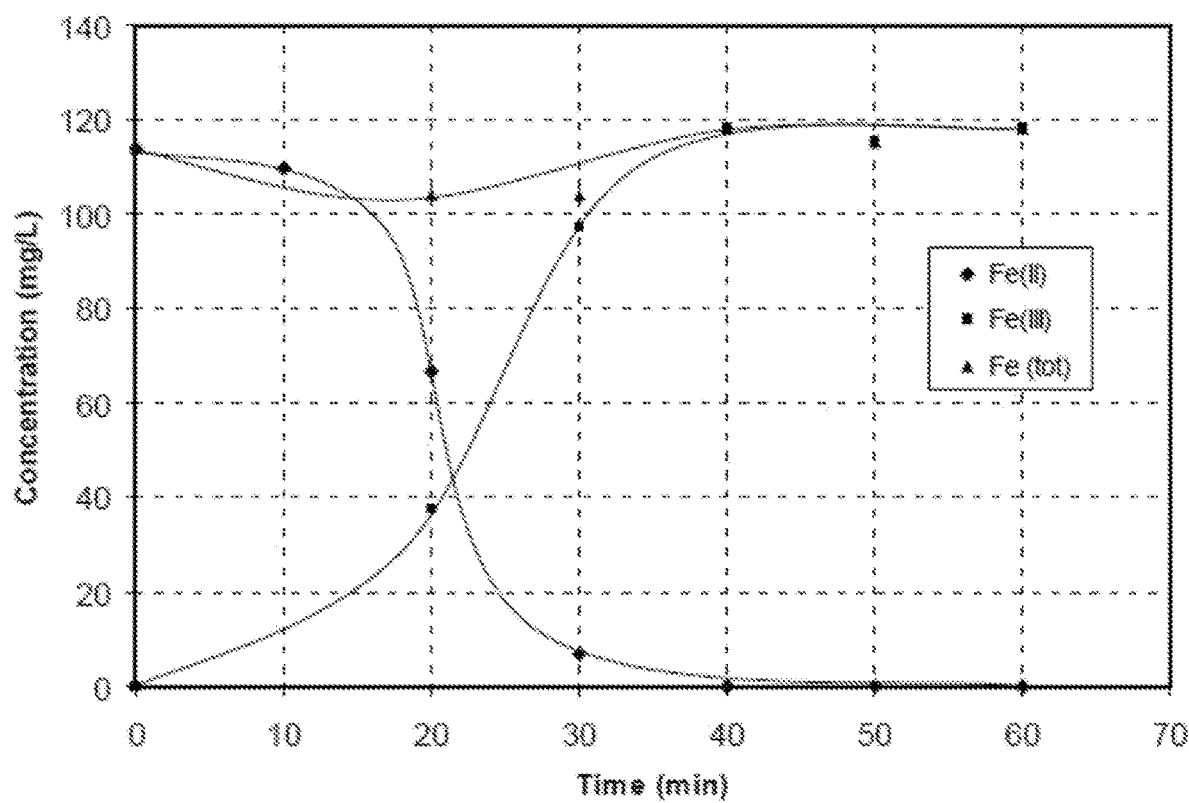
FIG. 8 is a graph showing regenerated Fe(III) ion retention in the solution at pH 2.0.

The results of the first 60 minute run are shown in FIG. 8. In this example, nearly all of the Fe(II) ions in solution circulating through the 40-g catalyst bed were converted to Fe(III) ions in 40 minutes. Due to the low pH, about 100% of the ferric ions generated were retained in the solution at the end of the operation.

Example 5

An aqueous solution containing Fe(II) ions was prepared as described in Example 2, except the starting concentration of Fe(II) ions was about 1000 mg/L and the solution was adjusted to pH 2.0 using sulfuric acid. The solution was subsequently circulated through a 40-gram manganese oxide catalyst bed at a circulation rate of 220 mL/min. Iron concentration in solution was measured over time for a total of 60 minutes.

Figure 9:
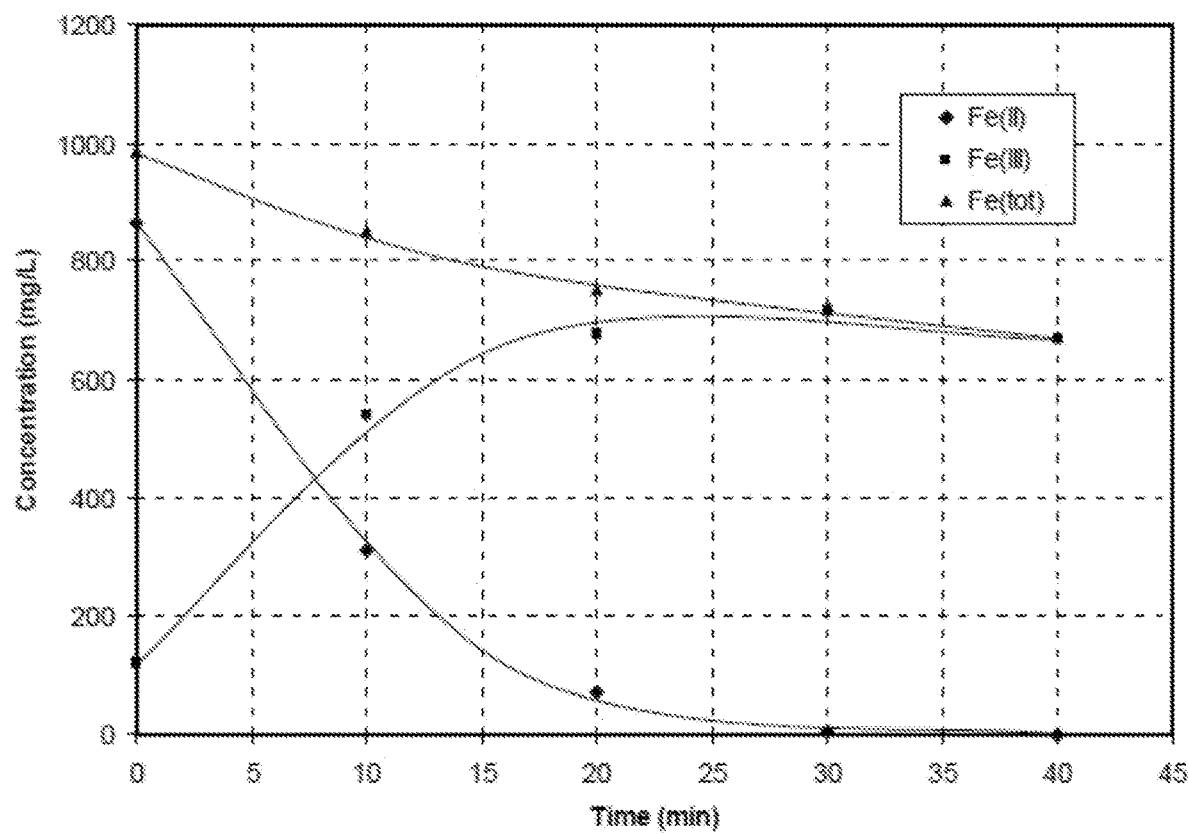
FIG. 9 is a graph showing retention of regenerated Fe(III) ions in the solution at high concentration at pH 2.0.

The results of the first 60 minute run are shown in FIG. 9. In this example, nearly all of the Fe(II) ions in solution circulating through the 40-g catalyst bed were converted to Fe(III) ions in 30 minutes. Even at a high starting concentration of Fe(II) at pH 2.0, 70% of the regenerated Fe(III) ions were retained in the solution.

Example 6

An aqueous solution containing Fe(II) ions was prepared as described in Example 2, except the solution was adjusted to pH 2.0 using sulfuric acid. The solution was circulated through a manganese oxide catalyst bed containing 5 g, 10 g, 20 g, or 30 g of manganese oxide catalyst at a circulation rate of 220 mL/min. The concentration of Fe(II) in the original solution was the same at 140 mg/L. However, the concentration changed during the pH adjustment by adding concentrated sulfuric acid to the solution. The concentration of Fe(II) and Fe(III) ions were monitored during the 60 minute run.

Figure 10:
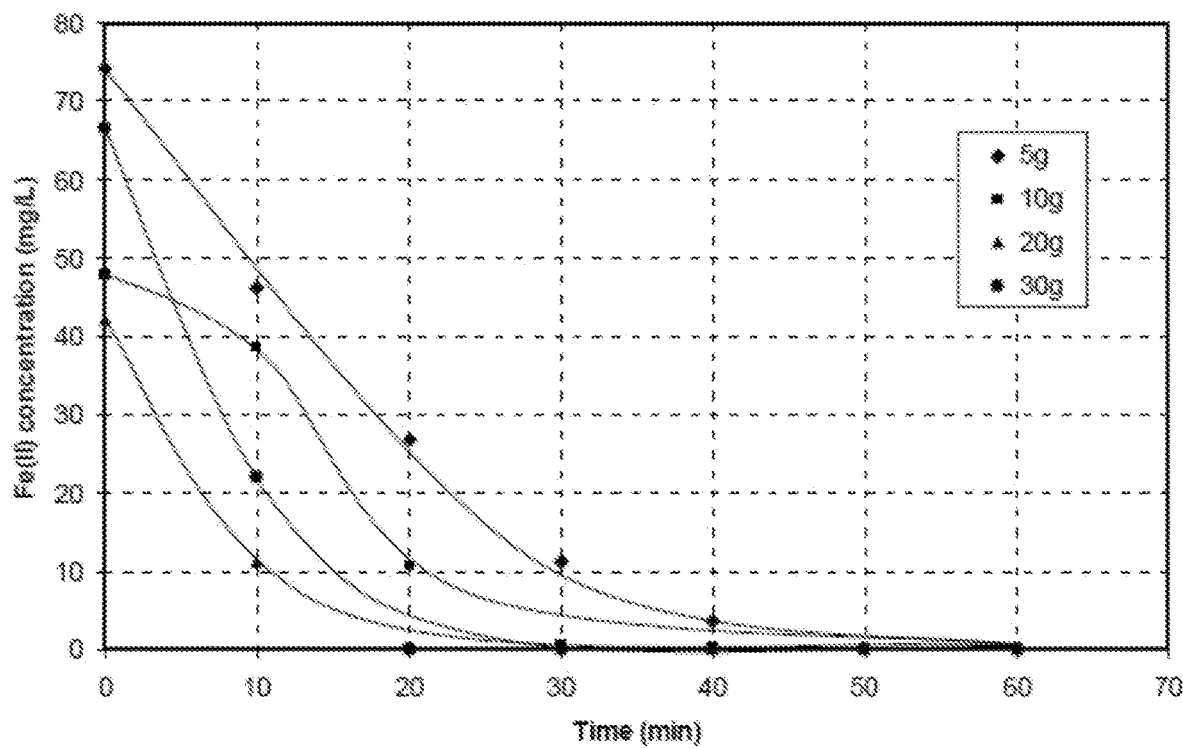
FIG. 10 is a graph showing the catalytic oxidation of Fe(II) ions at pH 2.0 with increasing amounts of manganese oxide catalyst.
Figure 11:
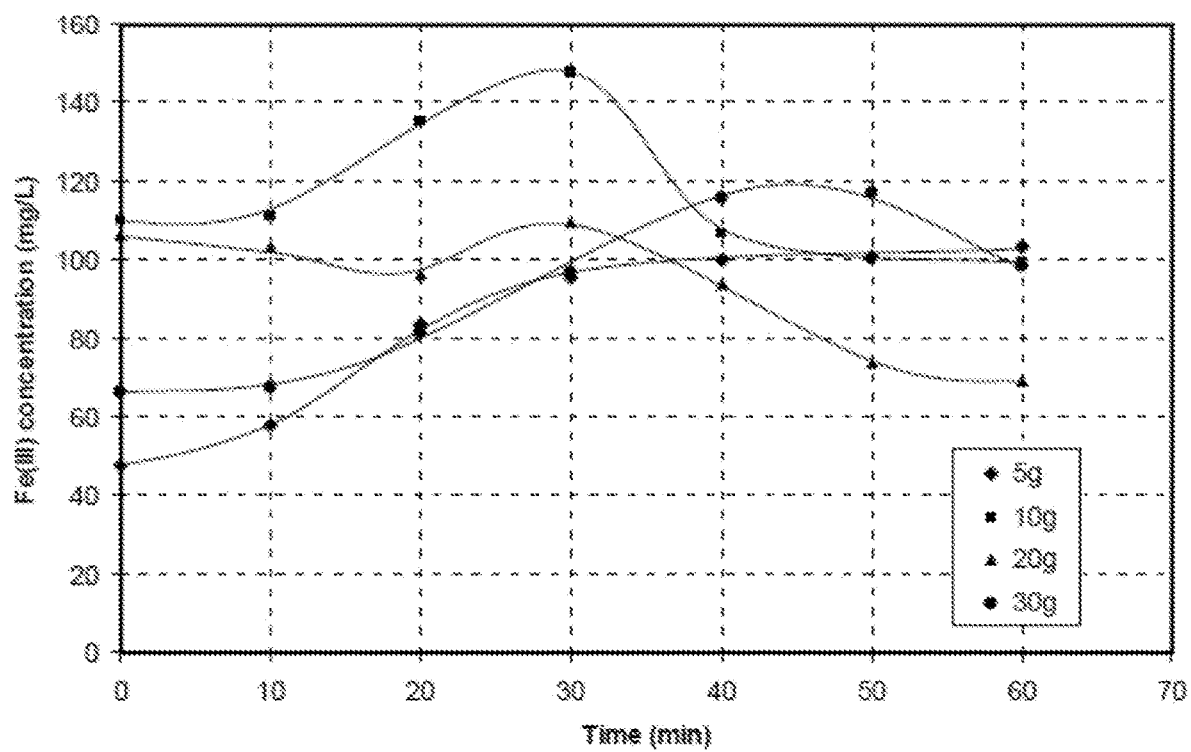
FIG. 11 is a graph showing regeneration of Fe(III) ions at pH 2.0 with increasing amounts of manganese oxide catalyst.

The results of the first 60 minute run are shown in FIGS. 10 and 11. The reaction rates among these tests are the same. The difference in time needed to oxidize all of the Fe(II) ions in FIG. 10 is due to the difference in initial concentrations. As shown in FIG. 11, these tests confirm that 5 and 30 grams of manganese oxide catalyst in the packed column does not make a difference in terms of oxidizing Fe(II) ions to Fe(III). Therefore, results show that it may be advantageous to use lower amounts of catalyst to minimize the deposition of Fe(III) at a higher pH.

Example 7

An aqueous solution containing Fe(II) ions was prepared as described in Example 2, except the starting concentration of Fe(II) ions was about 120 mg/L and the solution was adjusted to pH 1.91 using sulfuric acid. The solution was subsequently circulated through a 5-gram manganese oxide catalyst bed at a circulation rate of 220 mL/min. Iron concentration in solution was measured over time for a total of 60 minutes.

Figure 12:
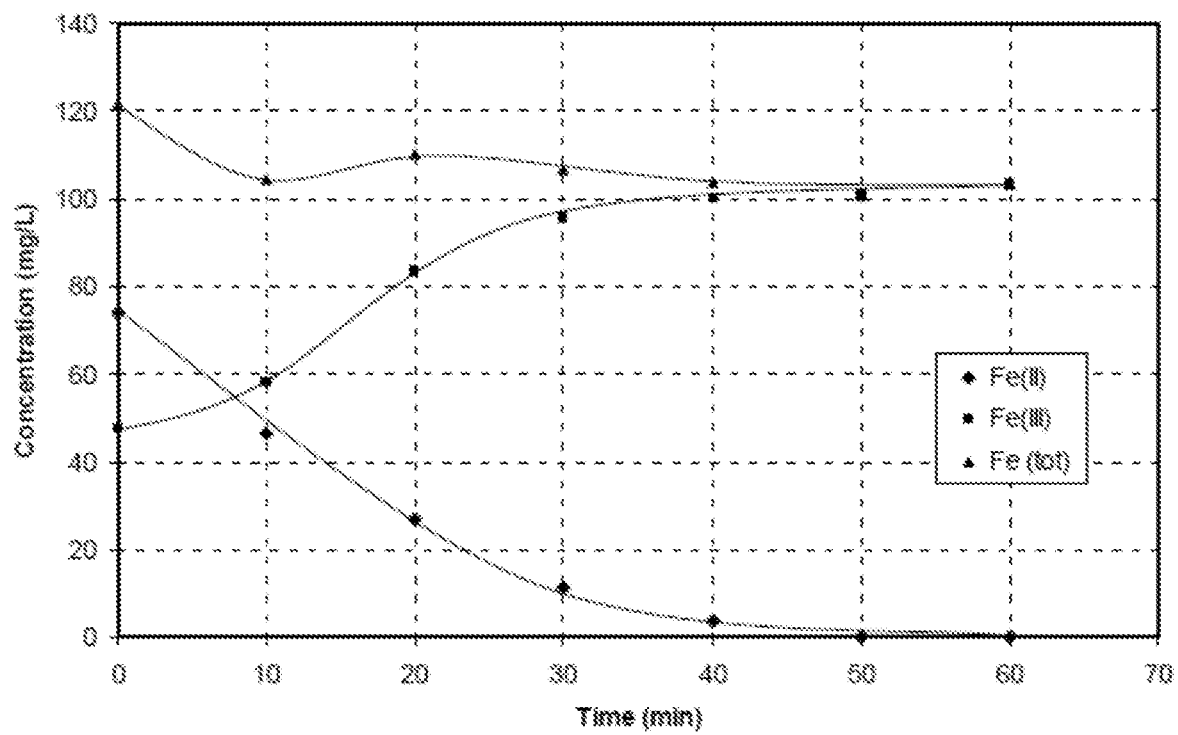
FIG. 12 is a graph showing regenerated Fe(III) ion retention in the solution at pH 1.91 with 5 grams of catalyst.

The results of the first 60 minute run are shown in FIG. 12. The 140 mg/L initial Fe(II) ion concentration dropped to less than 80 mg/L during pH adjustment with sulfuric acid. However, the Fe(II) ions were converted to Fe(III) ions during circulation of the solution through the catalyst bed. As a result, Fe(II) ion concentration rapidly dropped to zero and the total amount of dissolved iron in solution remained high.

Example 8

An aqueous solution containing Fe(II) ions was prepared as described in Example 2, except the starting concentration of Fe(II) ions was about 120 mg/L and the solution was adjusted to either pH 1.0, pH 2.0, or pH 3.0 using sulfuric acid. The solution was subsequently circulated through a 5-gram manganese oxide catalyst bed at a circulation rate of 220 mL/min. Iron concentration in solution was measured over time for a total of 60 minutes.

Figure 13:
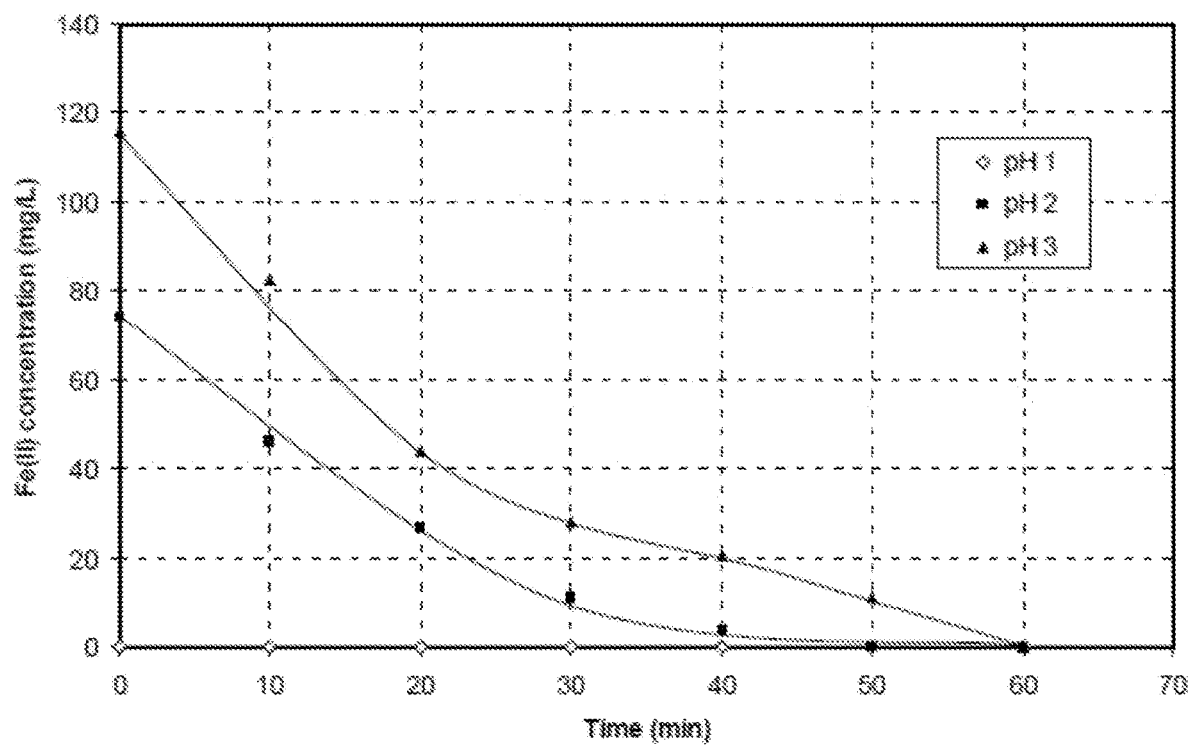
FIG. 13 is a graph showing Fe(II) ion oxidation at pH 1.0 to pH 3.0.
Figure 14:
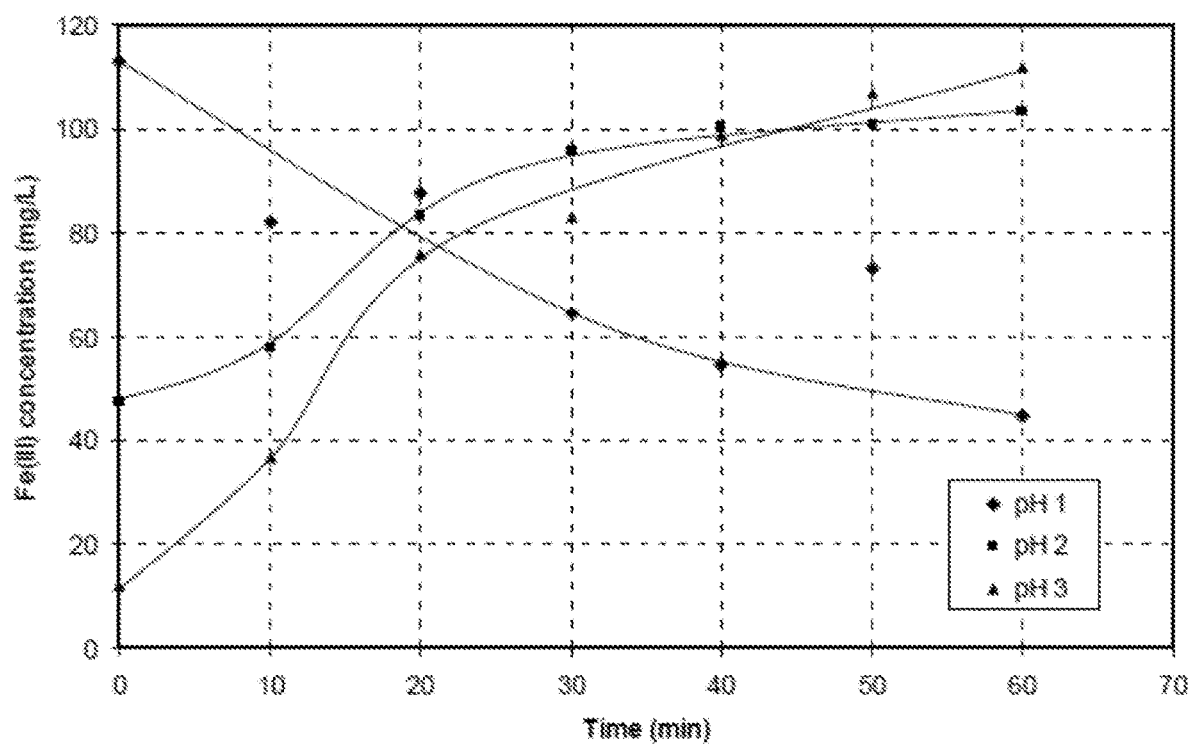
FIG. 14 is a graph showing regenerated Fe(III) ion retention in the solution at pH 1.0 to pH 3.0.

The results of the first 60 minute run are shown in FIGS. 13 and 14. As shown in FIG. 13, Fe(II) ion concentration dropped during pH adjustment. At pH 3, there was less than 1 mL sulfuric acid added to the solution, and therefore the initial Fe(II) ion concentration remained at around 120 mg/L. A significant amount of concentrated sulfuric acid was added to adjust the pH to 1. Therefore, even before the circulation Fe(II) ions were not detected. With only 5 grams of manganese oxide in the bed, Fe(II) was still quickly converted to Fe(III). FIG. 14 shows the formation and retention of Fe(III) for each pH. With only 5 grams of $MnO_2$ in the system, less than 10% of the total iron (Fe(II) and Fe(III)) was deposited in the catalyst bed.

Example 9

An aqueous solution containing Fe(II) ions was prepared as described in Example 2, except the starting concentration of Fe(II) ions was about 120 mg/L and the solution was adjusted from a pH of 3.11 to a pH of 3.37 using sulfuric acid over the course of the 60 minute run.

Figure 15:
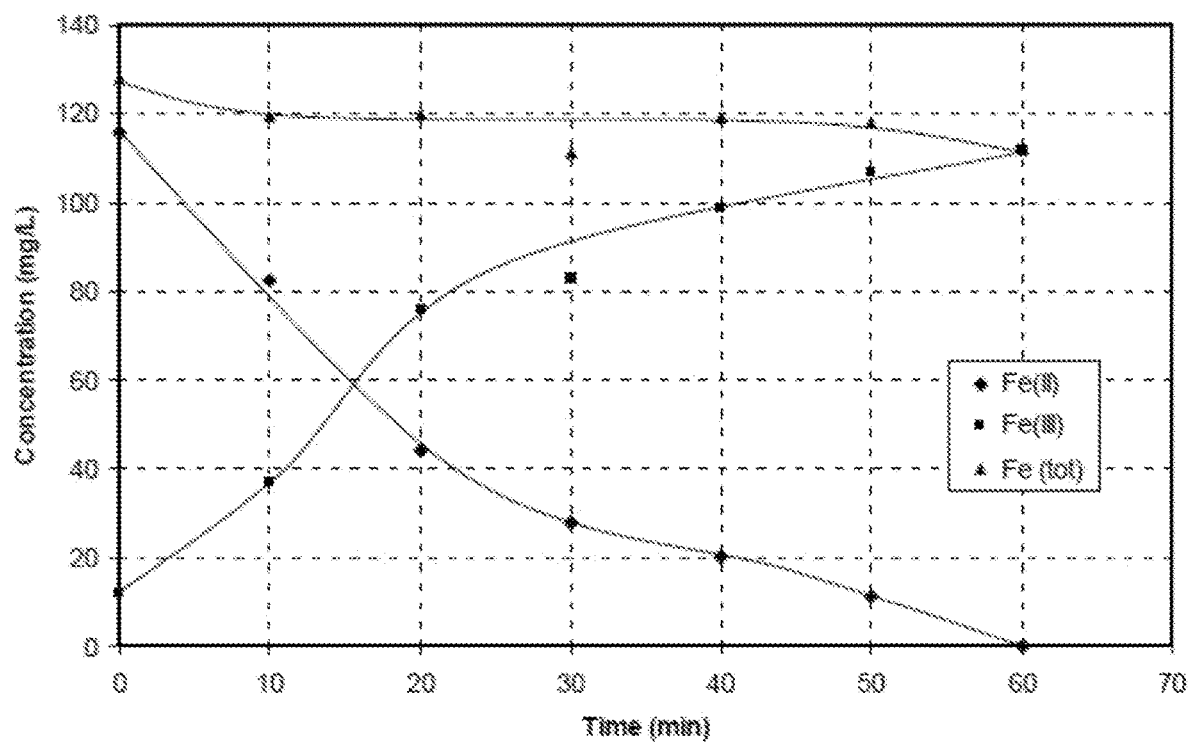
FIG. 15 is a graph showing regenerated Fe(III) ion retention in the solution at increasing pH from pH 3.1 to pH 3.37 over the course of the 60 minute run.

The results of the first 60 minute run are shown in FIG. 15. This experiment shows that the total iron maintained high while Fe(II) was converted to Fe(III) during a pH change from 3.11 to 3.37 through the 60-minute circulation.

Iron Concentration Measurement

Total iron content in aqueous solutions was measured using atomic absorption spectrometer (AAS) and Ferrous ions were determined using Phenanthroline/UV-Vis spectrophotometer, both according to standard operating procedures. Ferric ion content in solution was determined by subtracting ferrous ion concentration from the total iron concentration in solution. Scale-up of the experimental system numbers is to be expected for larger scrubber systems used in industrial applications.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

What is claimed is:

1. A process for treating a hydrogen sulfide containing gas, comprising:
   contacting an aqueous solution containing ferric ions with the hydrogen sulfide containing gas, wherein the aqueous solution has a pH of about 6.0 or less,
   extracting and dissolving hydrogen sulfide from the hydrogen sulfide containing gas into the aqueous solution,
   reacting the dissolved hydrogen sulfide with the ferric ions in the aqueous solution to produce ferrous ions and sulfur, wherein the sulfur is insoluble in solution; and
   regenerating ferric ions in the aqueous solution using a catalyst.

2. The process of claim 1, further comprising contacting the aqueous solution with a second gas.

3. The process of claim 2, wherein the second gas is air.

4. The process of claim 1, wherein the aqueous solution has a pH of 4.5 or less.

5. The process of claim 4, wherein the aqueous solution has a pH of 2.0 or less.

6. The process of claim 1, wherein the catalyst is an oxide of manganese.

7. The process of claim 6, wherein the oxide of manganese is at least one of $MnO$, $MnO_2$, $Mn_2O_3$, $Mn_3O_4$, $MnO_3$, and $Mn_2O_7$.

8. The process of claim 6, wherein the oxide of manganese is $MnO_2$.

9. The process of claim 6, wherein the aqueous solution comprises a chelating agent.

10. The process of claim 9, wherein the chelating agent is at least one of ethylenediaminetetraacteic acid (EDTA), diacetylenetriaminepentaacetic acid (DTPA), or nitrilotriacetic acid (NTA), or a combination thereof.

11. The process of claim 1, further comprising removing the sulfur from the aqueous solution by performing a solid-liquid separation step.

12. The process of claim 1, wherein the aqueous solution contains about 100 mg/mL to about 200 mg/mL of the ferric ions.

13. The process of claim 1, wherein the gas is derived from at least one of natural gas,
   coke oven gas, syngas, biogas, sour gas, refinery gas, gasifier, and pyrolysis gas.

14. The process of claim 1, wherein said reacting occurs at a temperature between 20° C. and 30° C.

15. A process for treating a hydrogen sulfide containing gas comprising:
   i. contacting an aqueous solution containing ferric ions with the gas;
   ii. dissolving the hydrogen sulfide from the gas in the aqueous solution, and reacting the dissolved hydrogen sulfide with the ferric ions in the aqueous solution to produce ferrous ions and sulfur, wherein the sulfur is insoluble in solution;
   iii. removing the sulfur from the aqueous solution by solid-liquid separation;
   iv. contacting the ferrous ion-containing aqueous solution with an oxide of manganese;
   v. and regenerating the ferrous ions to ferric ions in the aqueous solution.

16. The process of claim 15, wherein the ferric ions are regenerated by contacting the aqueous solution with a second gas comprising oxygen, wherein the oxygen is dissolved in the aqueous solution.

17. The process of claim 15, wherein the oxide of manganese is $MnO_2$.

18. The process of claim 15, wherein the aqueous solution comprises a chelating agent.

19. The process of claim 18, wherein the chelating agent is at least one of ethylenediaminetetraacteic acid (EDTA), diacetylenetriaminepentaacetic acid (DTPA), or nitrilotriacetic acid (NTA).

20. The process of claim 15, wherein the aqueous solution has a pH of 4.5 or less.

21. The process of claim 15, wherein the aqueous solution has a pH of 2.0 or less.

22. The process of claim 15, wherein at least 75% of the ferrous ions relative to the total concentration of ferrous ions in solution are regenerated to ferric ions.

23. The process of claim 15, wherein at least 95% of the ferrous ions relative to the total concentration of ferrous ions in solution are regenerated to ferric ions in 60 minutes after contacting the ferrous ion-containing aqueous solution with an oxide of manganese.

24. The process of claim 15, wherein at least 95% of the ferrous ions relative to the total concentration of ferrous ions in solution are regenerated to ferric ions in 20 minutes after contacting the ferrous ion-containing aqueous solution with an oxide of manganese.

25. The process of claim 16, wherein the regenerated ferric ion containing solution is contacted with an additional gas comprising hydrogen sulfide.

26. The process of claim 15, wherein the gas is derived from at least one of natural gas, coke oven gas, syngas, biogas, sour gas, refinery gas, gasifier, and pyrolysis gas.

27. A catalytic regenerative chemical scrubbing system for treating a hydrogen sulfide containing gas comprising:
   a solid-liquid separator;
   a first scrubber comprising an inlet port capable of introducing the hydrogen sulfide containing gas, and an outlet port connected to the solid-liquid separator through a first circulating pump; and
   a second scrubber comprising a first inlet port capable of introducing an aqueous solution comprising ferrous ions and a second inlet port for introducing a compressed gas,
   wherein the second scrubber comprises an oxide of manganese,
   wherein the solid-liquid separator has a first outlet port connected to the first inlet port of the second scrubber through a second circulating pump, and
   wherein the second circulating pump circulates the aqueous solution comprising ferrous ions onto the manganese oxide in the second scrubber.

28. The catalytic regenerative chemical scrubbing system of claim 27, wherein the first scrubber further comprises a second inlet port for introducing an aqueous solution comprising regenerated ferric ions.

29. The catalytic regenerative chemical scrubbing system of claim 28, wherein the second inlet port is connected to the second scrubber.

30. The catalytic regenerative chemical scrubbing system of claim 27, wherein the first scrubber comprises a second outlet port for releasing a treated gas.

31. The catalytic regenerative chemical scrubbing system of claim 27, wherein the second scrubber further includes a second outlet port.

32. The catalytic regenerative chemical scrubbing system of claim 27, wherein the first scrubber is selected from a packed bed, bubble column, spray, or sieve tray tower.

33. The catalytic regenerative chemical scrubbing system of claim 27, wherein the second scrubber includes a liquid sprayer system.

34. A method of removing sulfur from a hydrogen sulfide containing gas and regenerating ferric ions comprising:
  i. reacting the hydrogen sulfide containing gas with an aqueous solution comprising ferric ions under conditions sufficient to dissolve the hydrogen sulfide in the solution to produce bisulfide and hydronium ions;
  ii. reacting the bisulfide with ferric ions in the solution to produce sulfur and ferrous ions; and
  iii. oxidizing the ferrous ion in the presence of an oxide of manganese to regenerate ferric ions in the aqueous solution, wherein the aqueous solution comprises dissolved oxygen from the air.

35. The method of claim 34, wherein the aqueous solution is contacted with compressed air to replenish the dissolved oxygen in the solution.

36. The method of claim 34, wherein the aqueous solution has a pH of 4.5 or less.

37. The method of claim 34, wherein the aqueous solution has a pH of 2.0 or less.

38. The method of claim 34, wherein the oxide of manganese is at least one of $MnO$, $MnO_2$, $Mn_2O_3$, $Mn_3O_4$, $MnO_3$, and $Mn_2O_7$.

39. The method of claim 34, wherein the oxide of manganese is $MnO_2$.

40. The method of claim 34, wherein the aqueous solution comprises a chelating agent.

41. The method of claim 40, wherein the chelating agent is at least one of ethylenediaminetetraacteic acid (EDTA), diacetylenetriaminepentaacetic acid (DTPA), or nitrilotriacetic acid (NTA), or a combination thereof.

42. The method of claim 34, wherein at least 75% of the ferrous ions relative to the total concentration of ferrous ions are regenerated to ferric ions.

43. The method of claim 34, wherein at least 95% of the ferrous ions relative to the total concentration of ferrous ions are regenerated to ferric ions in 60 minutes after contacting the ferrous ion-containing aqueous solution with an oxide of manganese.

44. The method of claim 34, wherein at least 95% of the ferrous ions relative to the total concentration of ferrous ions are regenerated to ferric ions in 20 minutes after contacting the ferrous ion-containing aqueous solution with an oxide of manganese.

45. A process for producing ferric ions and elemental sulfur comprising the following reactions:

$$H_2S_{(g)} + \tfrac{1}{2}O_{2(g)} \rightarrow S^o + H_2O \qquad (1);$$

$$H_2S_{(g)} + H_2O \leftrightarrow H_2S_{(l)} \qquad (2);$$

$$H_2S_{(l)} \leftrightarrow H^+ + HS^- \qquad (3);$$

$$HS^- + 2Fe^{+3} \rightarrow S^o + 2Fe^{+2} + H^+ \qquad (4);$$

$$\tfrac{1}{2}O_{2(g)} + H_2O_{(l)} \leftrightarrow \tfrac{1}{2}O_{2(l)} \qquad (5); \text{ and}$$

$$2Fe^{+2} + \tfrac{1}{2}O_{2(l)} + H_2O \rightarrow 2Fe^{+3} + 2OH^- \qquad (6),$$

wherein an oxide of manganese is used as a catalyst in reactions (5) and (6).

* * * * *